United States Patent [19]

Heintke et al.

[11] 4,153,359

[45] May 8, 1979

[54] COUPLING ARRANGEMENT FOR CAMERA AND FLASH UNIT

[75] Inventors: Hans E. Heintke, Wächtersbach; Hans Karey, Frankfurt; Robert Oberheim, Liederbach, all of Fed. Rep. of Germany

[73] Assignee: Braun Aktiengesellschaft, Frankfurt am Main, Fed. Rep. of Germany

[21] Appl. No.: 831,332

[22] Filed: Sep. 7, 1977

[30] Foreign Application Priority Data

Sep. 7, 1976 [DE] Fed. Rep. of Germany ....... 7627876

[51] Int. Cl.² .............................................. G03B 15/02
[52] U.S. Cl. ..................................... 354/126; 354/293
[58] Field of Search ................................ 354/126, 293

[56] References Cited

U.S. PATENT DOCUMENTS

| 2,388,995 | 11/1945 | Pollock | 354/126 |
| 2,688,071 | 8/1954 | Wright | 354/126 |
| 3,999,055 | 12/1976 | Wakahara et al. | 354/293 |

*Primary Examiner*—Russell E. Adams
*Attorney, Agent, or Firm*—Michael J. Striker

[57] ABSTRACT

A coupling arrangement for releasably coupling a flash unit with a camera unit, having a first coupling element adapted to be carried on one of the units, a second coupling element adapted to be carried on the other of the units engageable with the first element and forming with the same a bayonet coupling, and means for arresting the elements in a predetermined relative orientation subsequent to their engagement with one another.

11 Claims, 4 Drawing Figures

COUPLING ARRANGEMENT FOR CAMERA AND FLASH UNIT

BACKGROUND OF THE INVENTION

1. Field of the Invention

This invention relates to cameras using flash units.

More particularly, the invention relates to a coupling arrangement for releasably coupling a flash unit with a camera.

2. The Prior Art

Some cameras come with a flash unit permanently built in; other cameras use flash units which are detachable and are connected to the camera only when an actual need for flash illumination exists.

In connection with the latter type of camera it is known to provide so-called "shoes" on the camera and on the flash unit. When one of these shoes is inserted into the other with a straight-line pushing motion, the flash unit is coupled with the camera.

Modern high-performance flash units are relatively heavy. Because of this weight there is a danger that the two connected shoes may tilt relative to one another and interrupt the current path that is automatically established through these shoes or through contacts on them. Because of this, the use of such shoes in connection with high-performance flash units has become rare and screw couplins are being employed instead. These provide a more reliable (tilt-free) connection. However, to engage and disengage the coupling is now more time-consuming since the movable part of the coupling must be turned to engage or disengage the threaded connections. In many instances the time required for this is simply not available, and a never-to-be-repeated scene (e.g. snap-shot of a child, of an animal, of disaster in the making) is lost.

SUMMARY OF THE INVENTION

It is an object to overcome the disadvantages of the prior art.

More particularly, it is an object of the present invention to provide an improved coupling arrangement for releasably coupling a flash unit to a camera.

Another object is to provide such an arrangement which permits extremely rapid coupling and uncoupling of the flash unit and camera.

Pursuant to these objects and to others which will become apparent hereafter, one aspect of the invention resides in a coupling arrangement for releasably coupling a flash unit with a camera unit. Briefly stated, the arrangement may comprise a first coupling element adapted to be carried on one of the units; a second coupling element adapted to be carried on the other of the units engageable with the first element and forming with the same a bayonet coupling; and means for arresting the elements in a predetermined relative orientation subsequent to their engagement with one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

The Structure

Figure 1:
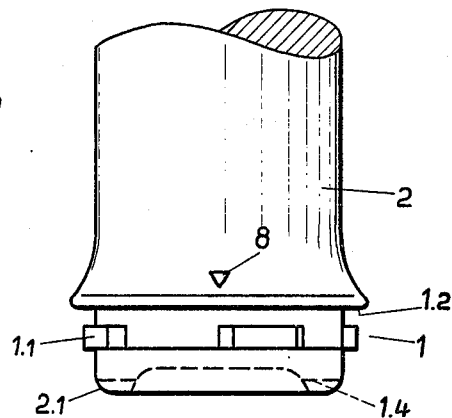
FIG. 1 is a side view, showing a portion of a flash unit with one coupling element thereon.

In FIG. 1 a portion of a bar-shaped handle 2 of a flash unit is illustrated; the flash unit per se is not shown. The handle 2 is provided with one element 1 of the novel coupling arrangement. This element has four (there could be fewer or more) flange-like projections 1.1 which extend transversely and are angularly spaced about the handle 2 in form of two sets each compared of two diametrally opposite ones of the projections 1.1.

Figure 2:
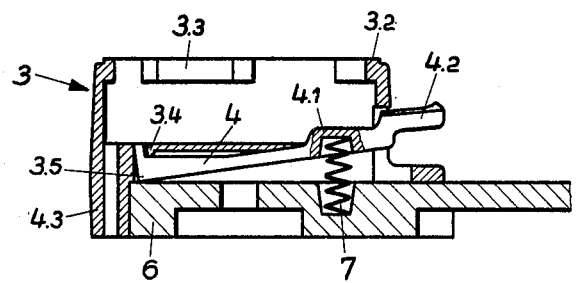
FIG. 2 is a partly sectioned view, showing another coupling element which cooperates with the one in FIG. 1.
Figure 3:
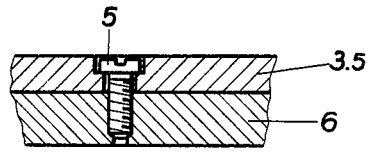
FIG. 3 is an enlarged sectional view, showing a detail of FIG. 2.
Figure 4:
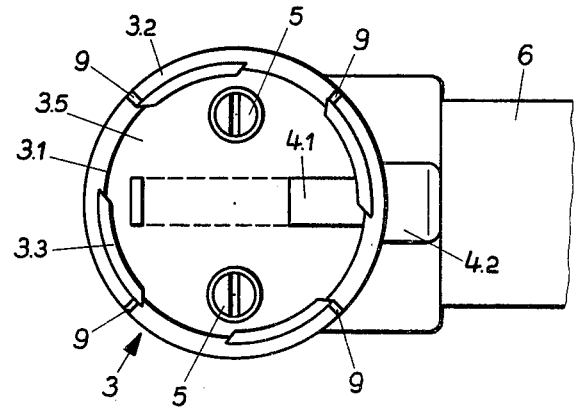
FIG. 4 is a top-plan view of the coupling element in FIG. 2.

FIGS. 2–4 show the other coupling element, i.e. a female coupling element 3 which cooperates with the male coupling element 1.

The female element 3 is formed as a ring having an upper open end bounded by a radially inwardly projecting circumferential shoulder. It is provided with four recesses 3.1 into which the respective flanges 1.1. are insertable. The shoulder forms intermediate the recesses 3.1 four inward projections or flanges 3.3 which are again arranged in pairs the flanges of which are located diametrally opposite one another.

The member 1 has an abutment surface 1.2; the member 3 has a planar abutment surface 3.2 which cooperates with the surface 1.2 when the two members are coupled. The axial thickness of the flanges 1.1 and 3.3 is so selected that when they interengage, the surfaces 1.2 and 3.2 will be drawn into full abutment with one another so that no tilting of the members 1, 3 relative to one another can occur.

Member 3 has a socket portion 3.5 which is formed with a central opening 3.4 for an arresting element 4. The latter has a portion 4.1 which extends into the chamber bounded by the wall of member 3. When member 1 is located in this chamber in predetermined angular orientation relative to member 3, the portion 4.1 extends into a transverse groove 1.4 which is formed in the bottom wall 2.1 of the member 1. A camera bracket 6 (to be releasably mounted on the not-illustrated camera) is secured (as by one or more screws 5 shown in FIG. 3) to the member 3. A spring 7 bears upon the bracket 6 and the arresting element 4, thus permanently tending to bias the element 4 to the groove-engaging position shown in FIG. 2.

The Operation

When the member 1 is inserted into the member 3 its flanges 1.1 pass through the respective recesses 3.1. The bottom wall 2.1 engages the portion 4.1 of the element 4 and presses it (FIG. 2) downwardly against the action of spring 7. This is possible because in this position the groove 1.4 is not in longitudinal registry with the element 4. After the member 1 has been fully axially inserted into the member 3, the members 1 and 3 are turned relative to one another so that the flanges 1.1 slide underneath the flanges 3.3. This causes the surfaces 1.2 and 3.2 to move into abutment and to slide on one another with no freedom of play (and hence no possibility that members 1, 3 might tilt relative to one another).

Turning of members 1, 3 relative to one another continues until the groove 1.4 moves into longitudinal registry with the element 4. As soon as this occurs the element 4 snaps into the groove 1.4 under the action of spring 7 and prevents any further turning. The elements 1, 3 (and thereby the flash unit and camera) are thus arrested in predetermined angular orientation relative to one another, namely in an orientation in which the flash window of the flash unit and the lens of the camera both face in one and the same direction.

To release the coupling the handle 4.2 of the element 4, which projects outwardly through a hole in the wall of member 3, is depressed against the action of spring 7. This retracts element 4 (downwardly) out of groove 1.4, thus permitting a reversal of the previous relative turning of members 1, 3 until the flanges 1.1 move into registry with the recesses 3.1, whereupon member 1 can be withdrawn from member 3.

Due to the central, symmetrical location of the element 4 and the cooperating groove 1.4 the members 1, 3 can be offset through 180° and still be used (by simply mounting the bracket 6 on the camera so that it faces left in FIG. 2 instead of right, as shown). This makes it possible to adapt the arrangement very readily for left-handed or right-handed users; also, it is handy when the flash unit in mounted condition is located laterally of the camera, instead of above it, because the operator can locate it at whichever side is most convenient for him.

The insertion of the male member 1 into the female member 3 can be further facilitated for the user if indicia are provided which show the relative orientation required of these members before the insertion can take place. For example, an indicium 8 may be provided on the male member 1 or, as shown in FIG. 1, on the flash-unit handle 2 which is provided with the male member. The indicium 8 is preferably located immediately above the abutment surface 1.2. Cooperating indicia 9 are provided on the female member 3, for example (FIG. 2) in form of four equi-angularly spaced narrow slots or recesses, which extend from the outer wall surface of female member 3 to the abutment surface 3.2 thereof. Thus, a user can rapidly place the male member in proper position for insertion by aligning the indicium 8 with one of the indicia 9. Conversely, he can tell that the members 1, 3 are securely locked together when he observes that the indicium 8 is located between two angularly adjacent ones of the indicia 9.

In addition to being simple and being rapidly engageable and disengageable, the disclosed coupling arrangement has other important advantages. For example, it has a rather small height, so that the overall space required is not very large and the flash unit need not project unnecessarily high above the camera to which it is coupled.

The invention is susceptible of various changes within the scope of the appended claims. The bayonet-connection need evidently not be identically the same as illustrated; modifications in it are possible and encompassed within the invention. The male member could be located on the camera (or on the bracket 6) and the female member on the flash-unit handle 2.

While the invention has been illustrated and described as embodied in a coupling arrangement for coupling a camera and a flash unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A coupling arrangement for releasably coupling a flash unit with a camera unit, comprising a first coupling element adapted to be carried on one of said units; a second coupling element adapted to be carried on the other of said units and engageable with said first element for relative turning movement about an axis; cooperating coupling portions on said elements and together forming a bayonet coupling which connects said coupling elements in response to relative turning movement of the same about said axis in one direction, and releases said coupling elements in response to such relative turning movement about said axis in the opposite direction; and releasable arresting means for arresting said elements against relative movement when said elements assume a predetermined relative orientation in response to said turning movement in said one direction.

2. A coupling arrangement as defined in claim 1, wherein said first coupling element is a male member and said second coupling element is a female member provided with a chamber in which said male member is receivable.

3. A coupling arrangement as defined in claim 2, wherein said male member is turnable in said chamber relative to said female member to and from said predetermined relative orientation.

4. A coupling arrangement as defined in claim 1, wherein said first coupling element is a male member on said flash unit and said second coupling element is a female member on said camera unit provided with a chamber in which said male member is receivable.

5. A coupling arrangement as defined in claim 1, said arresting means comprising an arresting element movable to and from an arresting position, and biasing means biasing said arresting element permanently to said arresting position.

6. A coupling arrangement for releasably coupling a flash unit with a camera unit, comprising a first coupling element adapted to be carried on one of said units, said first coupling element being a male member having transversely projecting first flanges and a groove; a second coupling element adapted to be carried on the other of said units engageable with said first element and forming with the same a bayonet coupling, said second coupling element being a female member provided with transversely projecting second comprising a first coupling element adapted to be carried on one of said units; a second coupling element adapted to be carried on the other of said units and engageable with said first element for relative turning movement about an axis; cooperating coupling portions on said elements and together forming a bayonet coupling which connects said coupling elements in response to relative turning movement of the same about said axis in one direction, and releases said coupling elements in response to such relative turning movement about said axis in the opposite direction; and releasable arresting means for arresting said elements against relative movement when said elements assume a predetermined relative orientation in response to said turning movement in said one direction.

7. A coupling arrangement as defined in claim 6, each of said members having an abutment surface, said first and second flanges being so dimensioned that when they engage one another in response to turning of said male member in said chamber, said abutment surfaces are in sliding abutment with each other.

8. A coupling arrangement as defined in claim 6; further comprising cooperating indicia on said male and female members for indicating said predetermined relative orientation as well as a relative position in which said male member is insertable into and withdrawable from said chamber.

9. A coupling arrangement as defined in claim 8, each of said members having an abutment surface, said first and second flanges being so dimensioned that when they engage one another in response to turning of said male member in said chamber, said abutment surfaces are in sliding abutment with each other, the indicia on said male member being located immediately upwardly of the abutment surface thereon and the indicia on said female member comprising slots extending from an outer circumference of said female member to the abutment surface of the same.

10. A coupling arrangement as defined in claim 9, wherein said slots are angularly spaced about said female member.

11. A coupling arrangement for releasably coupling a flash unit with a camera unit, comprising a male first coupling element adapted to be carried on a bar-shaped handle of said flash unit; a female second coupling element adapted to be carried on a bracket which is releasably connectable with said camera unit, said second coupling element being engageable with said first element and forming with the same a bayonet coupling; and means for arresting said elements in a predetermined relative orientation subsequent to their engagement with one another.

* * * * *